US008510727B2

(12) United States Patent
Lobo et al.

(10) Patent No.: US 8,510,727 B2
(45) Date of Patent: Aug. 13, 2013

(54) LINK-TIME REDUNDANT CODE ELIMINATION USING FUNCTIONAL EQUIVALENCE

(75) Inventors: Sheldon M. Lobo, Cary, NC (US); Fu-Hwa Wang, Saratoga, CA (US)

(73) Assignee: Oracle America, Inc., Redwood City, CA (US)

( * ) Notice: Subject to any disclaimer, the term of this patent is extended or adjusted under 35 U.S.C. 154(b) by 1447 days.

(21) Appl. No.: 12/050,853

(22) Filed: Mar. 18, 2008

(65) Prior Publication Data

US 2009/0241098 A1 Sep. 24, 2009

(51) Int. Cl.
*G06F 9/44* (2006.01)
(52) U.S. Cl.
USPC ........... 717/165; 717/153; 717/162; 717/163; 717/164; 717/167
(58) Field of Classification Search
USPC .......................................... 717/153, 162–167
See application file for complete search history.

(56) References Cited

U.S. PATENT DOCUMENTS

| 5,850,554 | A  | * | 12/1998 | Carver ........................... | 717/162 |
| 5,999,737 | A  | * | 12/1999 | Srivastava ..................... | 717/162 |
| 7,036,116 | B2 | * | 4/2006  | Haber et al. .................. | 717/151 |
| 7,130,867 | B2 | * | 10/2006 | Luke ............................. | 1/1 |
| 8,250,536 | B2 | * | 8/2012  | Woods .......................... | 717/123 |
| 2008/0007779 | A1 | * | 1/2008 | Van Gennip et al. ........ | 358/1.15 |

OTHER PUBLICATIONS

B.S. Baker, "A Program for Identifying Duplicated Code," Proc. Computing Science and Statistics: 24th Symp. Interface, vol. 24, pp. 49-57, Mar. 1992.*

* cited by examiner

*Primary Examiner* — Wei Zhen
*Assistant Examiner* — Mohammed Huda
(74) *Attorney, Agent, or Firm* — Marsh Fischmann & Breyfogle, LLP; Jon P. Deppe

(57) ABSTRACT

Duplicative code found in modules of high level computer code can be eliminated at link-time. A compiler forms a plurality of object files from a software program in which each object file includes one or more functions associated with the software program. An analyzer examines each function to ascertain whether any of the plurality of object files include functional duplicates. In addition, call and caller routing references are determined for each of the object files and functions contained therein. Responsive to determining that a functional equivalence exists, the routing of duplicative functions is altered to reference a golden copy of the same function. Once the call and caller information has been re-routed, the duplicative function(s) is(are) deleted.

15 Claims, 4 Drawing Sheets

210
```
int multiply_by_2(int a)
{
    return a * 2;
}
```

220
```
int shift_left_by_1(int a)
{
    return a << 1;
}
```

230
```
multiply_by_2:
    retl
    sll    %o0, 0x1, %o0
```

240
```
shift_left_by_1:
    retl
    sll    %o0, 0x1, %o0
```

*Fig. 2B*

250
```
...
    call multiply_by_2
...
    call shift_left_by_1
...
...
multiply_by_2:
    retl
    sll    %o0, 0x1, %o0
...
...
shift_left_by_1:
    retl
    sll    %o0, 0x1, %o0
...
```

*Fig. 2C*

270
```
...
    call multiply_by_2
...
    call shift_left_by_1
...
...
multiply_by_2:
shift_left_by_1:
    retl
    sll    %o0, 0x1, %o0
...
```

*Fig. 2D*

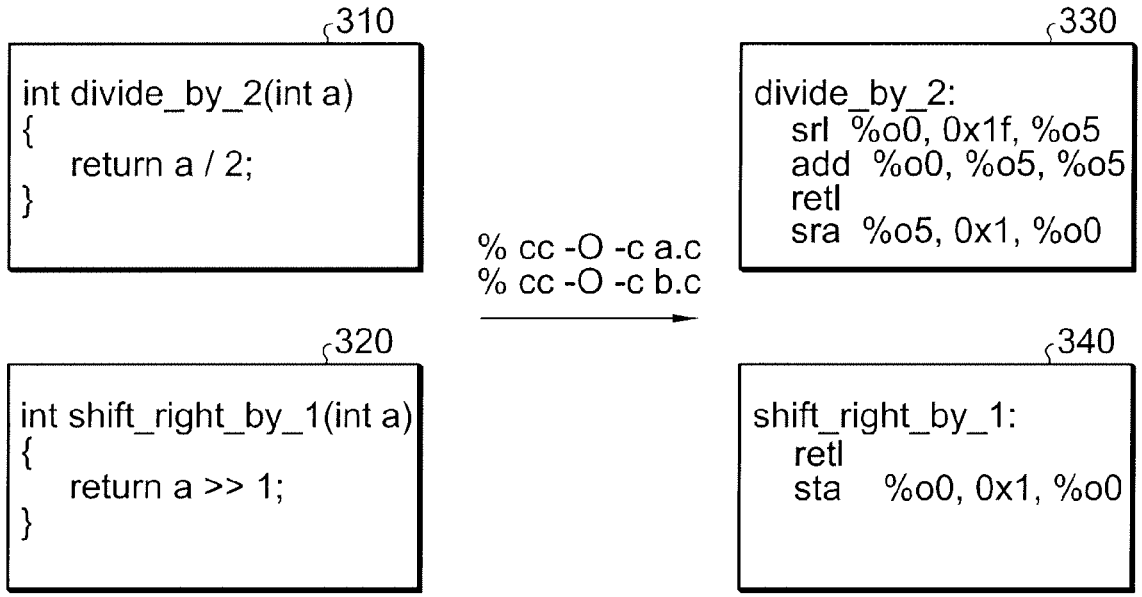
Fig. 3A
Fig. 3B
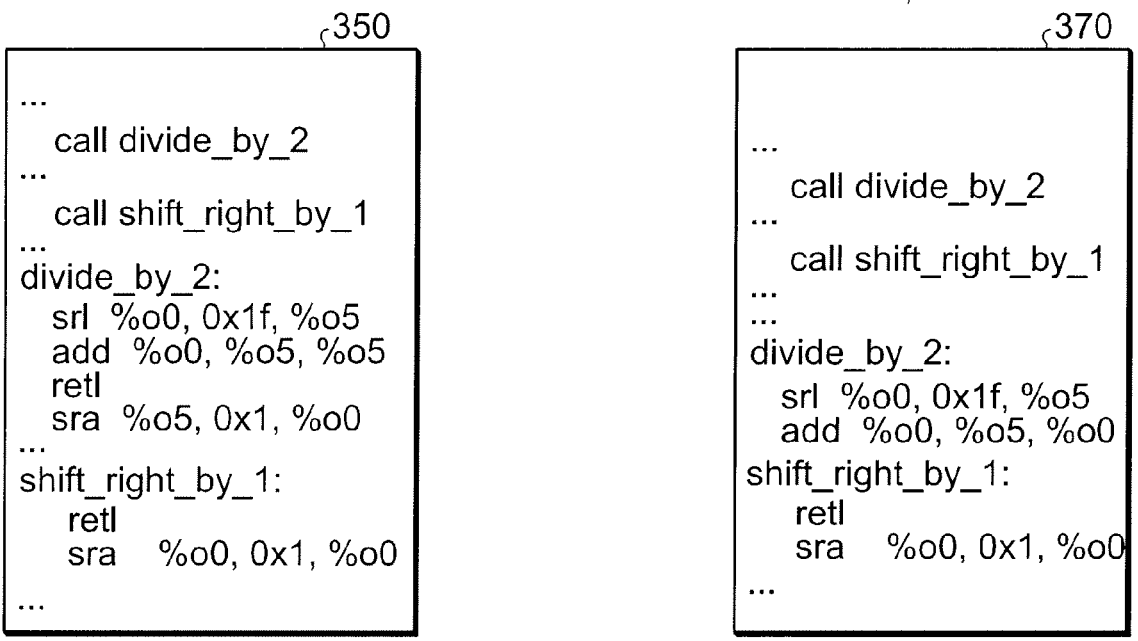
Fig. 3C
Fig. 3D

LINK-TIME REDUNDANT CODE ELIMINATION USING FUNCTIONAL EQUIVALENCE

BACKGROUND OF THE INVENTION

1. Field of the Invention

Embodiments of the present invention relate, in general, to systems and methods for managing duplicate code and particularly to eliminating functionally equivalent code at link time.

2. Relevant Background

Computer systems carry out processes defined by a collection of instructions. These instructions are defined in high level programming languages such as Basic, Fortran, C, C++, and the like. Using compliers, linkers, and assemblers these processes are converted into instructions which can be executed by a machine. While the high level language (also referred to herein as source code) is readily understandable by humans, its conversion into machine language, also known as executable code, transforms the instructions into a series of zeros and ones that is essentially indecipherable by a human.

Software of any considerable size and function is typically written in modules. There are considerable advantages to developing code in such a modular format but along with such advantages also come disadvantages. These modules are discrete functional portions of the overall software package that, when combined, interact to form the desired software product. Each of these modules is generally compiled separately into what is commonly known in the art as object code. The various modules of object code can be easily relocated and linked forming a product that can be executed by a machine.

As is known to one skilled in the relevant art, a compiler attempts to optimize each module of source code by using relatively simple rules and functions. For example, a compiler can recognize a certain source code command as carrying out a series of steps such as a summation or a multiplication. Rather than generating source code for the steps necessary to access and manipulate various registers for a simple function, the compiler identifies the process as one that is common and implemented in a standard fashion.

However, each module of a large software product is typically compiled individually. A compiler cannot examine the entire software product from a global perspective to view the behavior or the role that any one module may play. As a result, functionality developed within individual modules is often duplicated by other modules. It is well known in the art of computer science and software programming that source code is written with a great deal of duplication. While each module attempts to efficiently achieve its assigned task, each is written in relative isolation, and achieving that task is likely to comprise the same functionalities of another module within the software product. This form of duplication is compounded by compilers generating the same assembly code for different source code constructs.

The result is that within the machine executable code of a particular process there exists a vast amount of duplication. This duplicate code increases the overall size of a project requiring additional valuable storage capacity and it can also slow the overall product performance due to an increased I-cache latency access. It is estimated that common computer systems such as Linux, Windows, and Java are composed of as much as 20-30% duplicate code. Generally the culprit of such duplication is an over reliance on high level programming language abstractions. Abstractions are difficult to conceive and use thus, once formed, the tendency is to duplicate them rather than modify them for efficiency. Thus software machine code is littered with portions of code that are either exactly or functionally identical to other portions of code.

Linkers do possess a global view of all of the modules linked together to form a software product. Recall that linkers function to join these modules together into the overall software product. However, linkers possess limited functionality. Generally linkers collate code and data and form a binary file for execution and, in some cases, identify and remove code that possesses unused functions. This is referred to in the art as removing dead code. However, two separate blocks of code possessing the same functionality accessed by separate portions of the product would go unnoticed by the linker. Linkers lack the necessary information to reliably disassemble the code sections into functions and basic blocks from which a duplication of code could be detected. Linkers also lack the ability to manage such duplicate code once found.

SUMMARY OF THE INVENTION

A computer system and method are directed toward eliminating functionally equivalent code at link-time. According to one embodiment of the present invention, a system for eliminating functionally equivalent machine code is disclosed. A compiler forms a plurality of object files from a software program comprised of a plurality of program code modules. Each object file includes one or more functions associated with the software program.

According to one embodiment of the present invention, an analyzer examines each object file to ascertain whether any of the plurality of object files include duplicate machine code. In addition, call and caller routing references are determined for each of the object files and functions contained therein. Responsive to determining that a functional equivalence exists, the routing of duplicative function is altered to reference a golden copy of the same function. Once the call and caller information has been re-routed, the duplicative function is deleted.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

According to another embodiment of the present invention, a method for eliminating functionally equivalent machine code is disclosed. A compiler compiles a plurality of modules of program code into object files. Each object file includes one or more functions as expressed in machine code. According to one embodiment of the present invention, the machine code in each object file is analyzed to determine whether functional equivalence exists in any of the files. In addition, call and caller routing information is determined for each function. One of the functions is identified as a golden copy while others possessing the same functionality are deemed duplicative. According to one embodiment of the present invention, the call and caller routing information targeting the duplicative functions is re-routed to the golden copy. Thereafter all duplicative versions of the function embodied in the golden copy are deleted.

BRIEF DESCRIPTION OF THE DRAWINGS

The aforementioned and other features and objects of the present invention and the manner of attaining them will become more apparent, and the invention itself will be best understood, by reference to the following description of a preferred embodiment taken in conjunction with the accompanying drawings, wherein:

FIGS. 2a-d show an example of redundant code elimination according to one embodiment of the present invention;

FIGS. 3a-d show an example of elimination of functionally equivalent code according to one embodiment of the present invention.

Figure 1:
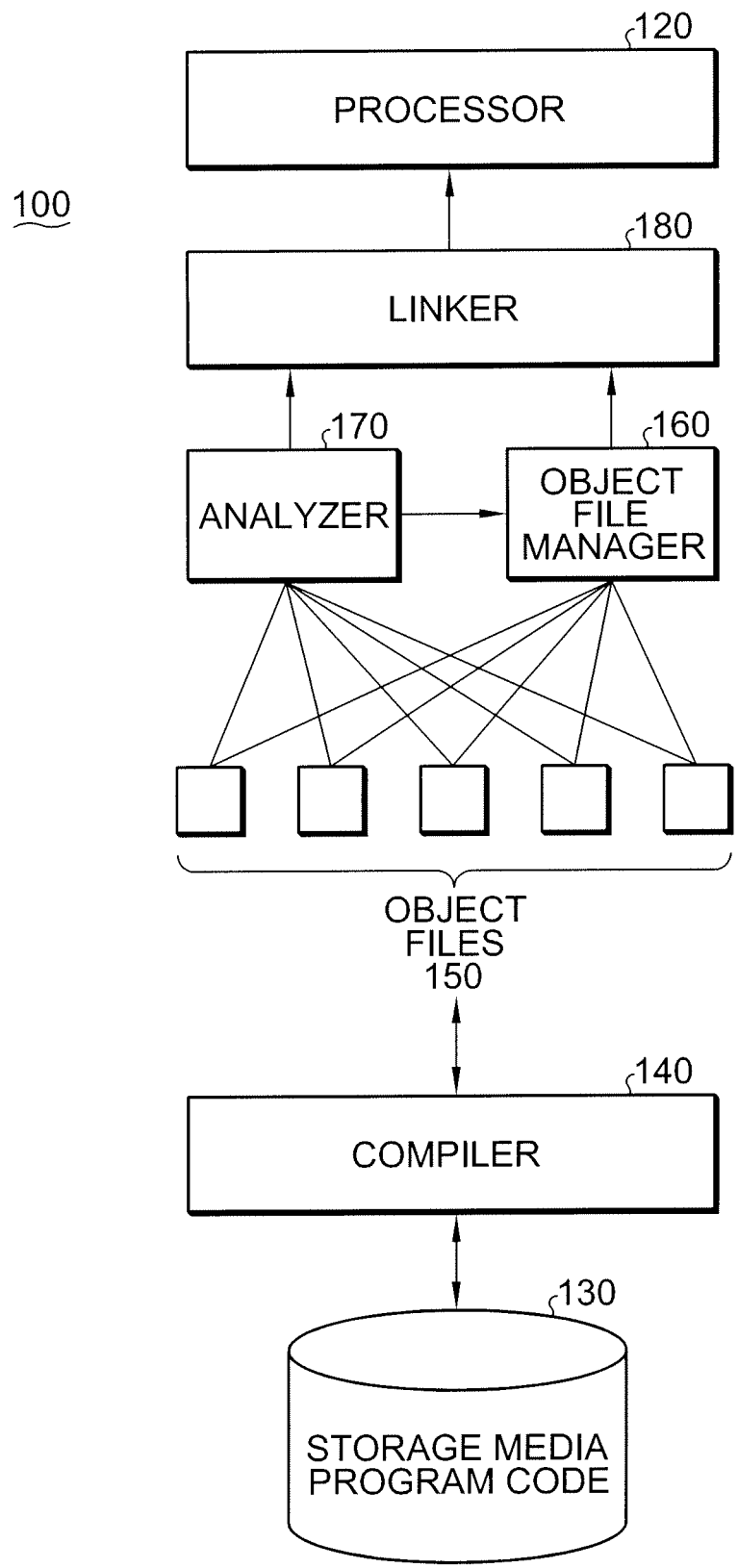
FIG. 1 shows a high level block diagram of a system for eliminating functional equivalent code at link-time according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

The modular development of software code results in duplicative functional code. The present invention identifies and eliminates functionally equivalent code at link-time. Rather than identifying redundant source code, the present invention analyzes object files during the linking process. According to the present invention, an analyzer identifies the function possessed by each object file and then analyzes the collection of functions to ascertain whether any of the functions are equivalent. Upon identifying functionally equivalent functions, one such function is labeled as the golden copy and the others as duplicates. Routing information regarding each function is determined and then modified so as to reference only the golden copy of the function. Thereafter all of the duplicative or redundant copies of the golden copy are deleted.

Specific embodiments of the present invention are hereafter described in detail with reference to the accompanying Figures. Like elements in the various Figures are identified by like reference numerals for consistency. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

FIG. 1 shows a high level block diagram of a system for link-time functional equivalence elimination 100 according to the present invention. The system 100 includes a processor 120 capable of executing instruction embodied as software code and a storage media 130 for storing such program code. As one skilled in the art can appreciate, code written in high level language such as C, Fortran, and the like can not be executed by a processor. The instructions must first be converted to machine code.

The system shown in FIG. 1 includes a compiler 140 that receives the source code from the storage media 130 in the form of modules and converts the modules into object files 150. The object files 150 comprise machine code that can be linked together by a linker 180 to form a cohesive software program that is executable by the processor 120.

According to one embodiment of the present invention and as shown in FIG. 1, interposed between the object files 150 produced by the compiler 140 and the linker 180 is an object file analyzer 170 and an object file manager 160. According to one embodiment of the present invention, the analyzer 170 scans the object files 150 for functionally duplicative portions of code. In addition, routing information associated with each function found in the object files 150 is mapped on what is referred to as a call table. When duplicative functions are found, a list of the duplicate functions and their routing information is passed to the object file manager 160. This is made possible, according to one embodiment of the present invention, by certain annotation information provided to each object file by the compiler. The compiler adds to each object file reliable information on a function's boundaries and parameters as well as address information that allows optimization on an individual instructions level.

The object file manager 160, according to the present invention, identifies one of the duplicative functions as a golden copy rendering the remaining functions as redundant functional copies. According to one embodiment, the analyzer 170 scans for functions from small to large, thus the smallest portion of code associated with a particular function is identified first and generally labeled as the golden copy. In such a manner, the most storage efficient section of code is retained for each duplicative function.

With a functional golden copy identified, the object file manager 160 alters the routing information of the redundant functional copies so as to direct all calls for the function to the golden copy. Thereafter, the object file manager 160 deletes the redundant functional copies leaving a single functional machine code version.

FIGS. 2a-2d are block diagrams of an example of redundant code elimination according to one embodiment of the present invention. FIG. 2a presents two examples of source code 210, 220 for apparently different functions. The first function 210 presents an instruction to multiply an integer by 2. The second function 220 presents an instruction to perform a logical shift corresponding to a shift left by 1.

These two distinct functions are compiled creating object files 230 and 240. The object file 230 associated with the first function 210 includes an instruction to multiply the number by 2 and the operative code "retl sll %o0,0x1,%o0". One skilled in the art will recognize that "retl" commands return to the calling function and the "sll" instruction is the equivalent of an instruction to multiply a number by 2. Likewise, the compilation 240 of the second function 220 yields an instruction to shift left by 1 and an operative code of "retl sll %o0, 0x1,%o0". According to the prior art, the resulting linked code of these two functions 210, 220 would be that shown in FIG. 2c. Despite the fact that the operative machine code is identical for both functions, the duplicate code remains 250. According to the present invention, the redundant portion of machine code would be identified and eliminated. In this case, either the first compiled function 230 or the second compiled function 240 would be identified and retained as the golden copy. In this case, assume the first function 230 would be designated as the golden copy. A call graph is built mapping the calling relationships between the two respective instructional calls and the functional code. The second function's 240 call information, the shift_left_by_1, is then re-routed to refer to the later portion of the first function 230. The result, as shown in FIG. 2d, is each call instruction directed to the same operative code 270. As can be clearly seen, the amount of code necessary for functionally executing these two functions, 210, 220, is, according to the present invention, dramatically reduced. (note that the present example is based on Sun Microsystems Inc. SPARC machine code) In a similar manner, the present invention can identify the presence of duplicate machine code even when the order of the independent functions are different. For example, a module may produce machine code that presents an addition instruction followed by a subtraction instruction while another module may first direct the subtraction followed by the addition. The function of the two modules is the same, and while the code is technically different, the codes are functionally duplicates. The present invention can identify this redundancy and eliminate it from the program.

According to one embodiment of the present invention, the identification can be found using a control flow graph. A control flow graph is a representation, using graph notation, of all paths that might be traversed through a program during its execution. Each node in the graph represents a basic block, i.e. a straight-line piece of code without any jumps or jump targets; jump targets start a block, and jumps end a block. Directed edges are used to represent jumps in the control flow. There are, in most presentations, two specially designated blocks: the entry block, through which control enters into the flow graph, and the exit block, through which all control flow leaves.

According to the present invention, the analyzer builds a control flow graph for the functions associated with the object files. Based on the annotation embedded into the functions from the compiler, the analyzer can parse the functions and reassemble them in a graphical format. The paths between these functions are compared to ascertain where they overlap and/or become identical, thus indicating a duplicative function. Functional equivalence can also be identified by using what is known in the art as a data flow graph. A data flow graph is a graphical representation of the "flow" of data through an information system. A data flow graph can also be used for the visualization of data processing. Thus the analyzer in the present invention can track the flow of data through all possible paths in the execution flow. Using this information, the analyzer can determine whether two functions are functionally equivalent even though they may have different machine code.

FIGS. 3a-d show an example of the elimination of duplicative functional code when the machine code associated with each function is different according to the present invention. FIG. 3a shows two functions 310, 320. The first function 310 directs the division of a number by 2 while the second function 320 a logical shift corresponding to a shift right by 1. After the source code 310, 320 of FIG. 3a is compiled, the object files 330, 340 of FIG. 3b result. The code of the first function 330 includes two instructions and a register address. The code of the second function 340 includes a single instruction and register address. Note that the code of FIG. 3b shown in the first function 330 and the second function 340 is distinct.

Common to both the first function 330 and the second function 340 is a return instruction and a shift right. This is depicted in FIG. 3b as "retl" and "sra". The registers associated with each of these instructions, however, are different. In the first function 330, the register is %o5 while in the second function 340 the register is %o0. Nonetheless, the sub-function, or functional fragment, of return and shift right is common to both, and according to one embodiment of the present invention, this duplication of the functional fragment or sub-function can be eliminated.

FIGS. 3c and 3d present a comparison of the optimization possible by virtue of the present invention. FIG. 3c is the linked code of the first function 330 and the second function 340 as would be known in the art. The two functions are essentially linked together with no elimination of code. According to the present invention, and as shown in FIG. 3d, the combination, or linking, of the code can be optimized by eliminating redundant code. The code in FIG. 3d shows that the duplicate return and shift right instruction has been eliminated by modifying the register address.

Figure 4:
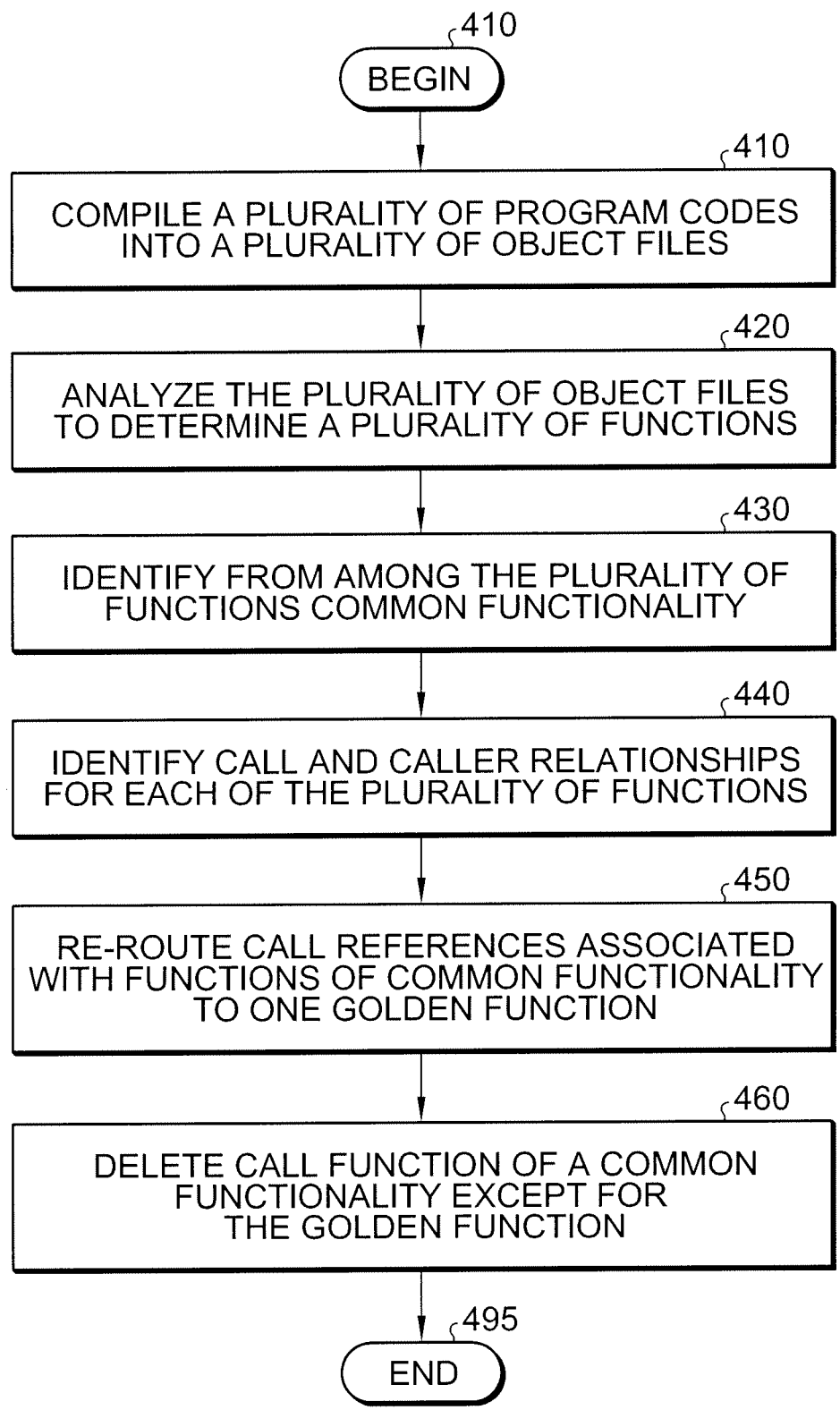
FIG. 4 shows a method embodiment for eliminating functionally equivalent code at link-time according to the present invention.

FIG. 4 is a flowchart showing a method embodiment for eliminating duplicative functional code at link-time according to the present invention. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

The process begins 405 with the compilation 410 of a plurality of software modules. These modules are typically written in high level languages such as C, Fortran, Basic, or the like. From each module an object file is created that is comprised of machine code. Prior to the machine code in each object file being linked so that it can be executed by a processor, an analyzer examines 420 the plurality of object files to identify the functions that are present in each of the object files. In one embodiment of the present invention, this examination involves the creation of a control flow graph that parses each function and maps the execution of the plurality of functions found in the program. Annotations embedded in the code from the compiler provide data such as functional boundaries and parameters as well as address information.

According to another embodiment of the present invention, a data flow graph is constructed to identify functional duplicates that may not be evident by solely examining the flow of the execution of the functions. By examining the path that the data travels, functional duplicates can be identified.

Using control flow and data flow graphs, one embodiment of the present invention identifies 430 common functionality from among the plurality of functions resident in the object files. This information is passed to the object file manager. In addition a call graph is built that identifies 440 and outlines the call and caller relationship of each function.

Using the call information combined with the identification of functional duplicates, the object file manager identifies one of a plurality of duplicate files as a golden copy and re-routes 450 all other call references from the other duplicate functions to the golden copy. Thus one copy of the same functionality is identified as being responsible for a function's execution rather than a plurality of duplicate code.

Once the call references to the duplicate functions have been re-routed to the golden copy, the functional duplicates serve no purpose and can be deleted 460 from the object files. With the duplicate functionalities removed from the object files, the linking of the remaining code can proceed as known in the art to provide to the processor a complete set of instructions in machine executable code.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative and not limiting.

While there have been described above the principles of the present invention in conjunction with duplicative code elimination, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

We claim:

1. A computer implemented system for link-time elimination of duplicative functions; the system comprising:
   a plurality of program codes stored in a memory that collectively form a program of instructions executable by a machine;
   a compiler executed by a microprocessor that is in operative communication with said memory and operable to convert said plurality of program codes into a plurality of object files comprising object code;
   an analyzer executed by a microprocessor that is operable to, at link time, identify from the plurality of object files a first function and a second function wherein the first function and the second function are duplicative, and wherein the object code corresponding to the first function is different than the object code corresponding to the second function, and wherein the first function and the second function are functional duplicates, and wherein the analyzer includes a data flow graph to track data values in an execution flow and wherein, based on tracking data values in the execution flow, functional equivalence can be determined;
   an object file manager executed by a microprocessor that is configured to, at link time, identify at least one reference targeting the second function and re-route the at least one reference to target the first function and thereafter to delete the second function.

2. The system of claim 1 wherein the compiler embeds annotations within the plurality of object files to correctly abstract machine code associated with each of the plurality of object files.

3. The system of claim 1 wherein the second function is a functional fragment of the first object file.

4. The system of claim 1 wherein the analyzer includes a control flow graph to identify functional duplicates, said control flow graph identifying each function associated with each of the plurality of object files.

5. The system of claim 4 wherein the analyzer searches for common functionality by beginning with small functions.

6. The system of claim 1 wherein the object file manager includes a call graph that maps references targeting the plurality of object files.

7. A method for link-time elimination of duplicative functionalities, the method comprising:
   compiling a plurality of program codes into a plurality of object files, wherein the plurality of program codes form a program of instructions executable by a machine, and wherein compiling includes embedding annotations within each of the plurality of object files to enable correct abstraction of machine code;
   analyzing, using a microprocessor, the plurality of object files to identify a plurality of functions at least partially based on said annotations in said plurality of object files wherein the plurality of functions includes a first function and a second function wherein the first function and the second function are duplicative, wherein analyzing includes building a data flow graph for each of the plurality of functions, and wherein analyzing includes tracking data values through possible execution paths and identifying functional equivalence among the plurality of functions; and
   identifying, using a microprocessor, call and caller references to each of the plurality of functions;
   re-routing, using a microprocessor, call references directed to the second function to the first function; and
   deleting the second function.

8. The method of claim 7 wherein the first function and second function are identical.

9. The method of claim 7 wherein analyzing includes building a control flow graph from the plurality of functions.

10. The method of claim 9 wherein analyzing includes scanning the plurality of functions for commonality.

11. The method of claim 7 wherein identifying includes building a call graph for each of the plurality of functions.

12. A non-transitory computer-readable storage medium tangibly embodying a program of instructions executable by a machine wherein said program of instruction comprises a plurality of program codes for link-time elimination of duplicative functionalities within a plurality of object files comprising object code, said program of instruction comprising:

one of said program codes for analyzing the plurality of object files to identify a plurality of functions;

program code for building a control flow graph from the plurality of functions;

program code for scanning the plurality of functions for commonalties and identifying a first function and a second function that are functionally duplicative, wherein the object code comprising the first function and second function is different;

program code for building a call graph for each of the plurality of functions including the first function and the second function, program code for identifying call and caller references to each of the plurality of functions from said call graph including the first function and the second function;

program code for building a data flow graph for each of the plurality of functions wherein the data flow graph tracks data values through possible execution paths and identifies functional equivalence among the plurality of functions;

program code for re-routing call references directed to the second function to the first function; and program code for deleting the second function.

13. The non-transitory computer-readable storage medium of claim 12 further comprising program code for embedding annotations within each of the plurality of object files to enable correct machine code abstraction.

14. The system of claim 1, wherein the object code of the first function and second function differs at least with respect to an order of the object code.

15. The non-transitory computer-readable storage medium of claim 12, wherein the object code of the first function and the second function differs at least with respect to an order of the object code.

* * * * *